(12) United States Patent
Brannstrom

(10) Patent No.: US 7,051,505 B2
(45) Date of Patent: May 30, 2006

(54) TOMATO HARVESTER

(76) Inventor: Greg Brannstrom, P.O. Box 81076, Bakersfield, CA (US) 93380

( * ) Notice: Subject to any disclaimer, the term of this patent is extended or adjusted under 35 U.S.C. 154(b) by 0 days.

(21) Appl. No.: 10/616,312

(22) Filed: Jul. 8, 2003

(65) Prior Publication Data

US 2004/0050029 A1 Mar. 18, 2004

Related U.S. Application Data

(60) Provisional application No. 60/405,180, filed on Aug. 21, 2002.

(51) Int. Cl.
*A01D 45/00* (2006.01)
(52) U.S. Cl. .................... 56/327.1; 56/134; 460/133
(58) Field of Classification Search ............... 56/327.1, 56/328.1, 134; 460/123, 133
See application file for complete search history.

(56) References Cited

U.S. PATENT DOCUMENTS

| | | | | |
|---|---|---|---|---|
| 2,065,169 A | * | 12/1936 | Carpenter .................. | 56/328.1 |
| 3,581,484 A | * | 6/1971 | Gilbert ...................... | 56/327.1 |
| 3,921,375 A | * | 11/1975 | Cetrulo, Jr. ................ | 56/327.1 |
| 4,184,314 A | * | 1/1980 | Hobbs ........................ | 56/372 |
| 4,232,506 A | * | 11/1980 | Studer ....................... | 56/327.1 |
| 4,915,671 A | * | 4/1990 | Johnson ...................... | 460/59 |
| 5,685,773 A | * | 11/1997 | Meester et al. ............. | 460/113 |
| 5,911,625 A | * | 6/1999 | von Allworden ........... | 460/119 |
| 6,003,293 A | * | 12/1999 | Boese ....................... | 56/327.1 |
| 6,675,568 B1 | * | 1/2004 | Patterson et al. ............ | 56/208 |

* cited by examiner

*Primary Examiner*—Thomas B. Will
*Assistant Examiner*—Alicia Torres
(74) *Attorney, Agent, or Firm*—James M. Duncan

(57) ABSTRACT

A new and more efficient tomato harvesting machine is capable of simultaneously severing up to three (3) rows of tomato vines or other similar crops. The harvesting machine comprises pick up means adjacent to the forward end of the machine for picking up and severing vinous crops from the field, where the crops remain attached to the vines, as the vines are severed. The pick up means carry the crops and vines rearwardly and upwardly. The harvesting machine further comprises separating means for separating crops from the vines. The present invention comprises improvements to the pickup means and the separating means. These improvements allow a harvester to gather vines and crops from up to three adjacent rows simultaneously, and to process the increased volume of vines and crops without overloading the processing equipment.

14 Claims, 7 Drawing Sheets

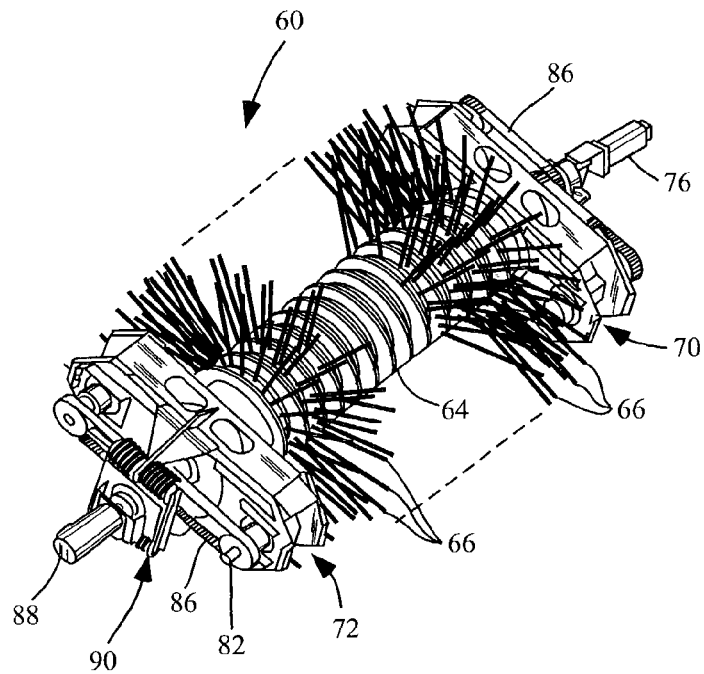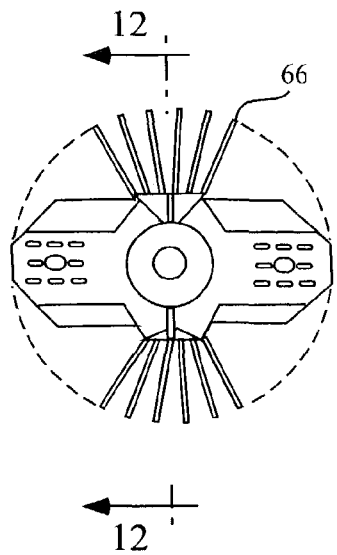
Fig. 10    Fig. 11
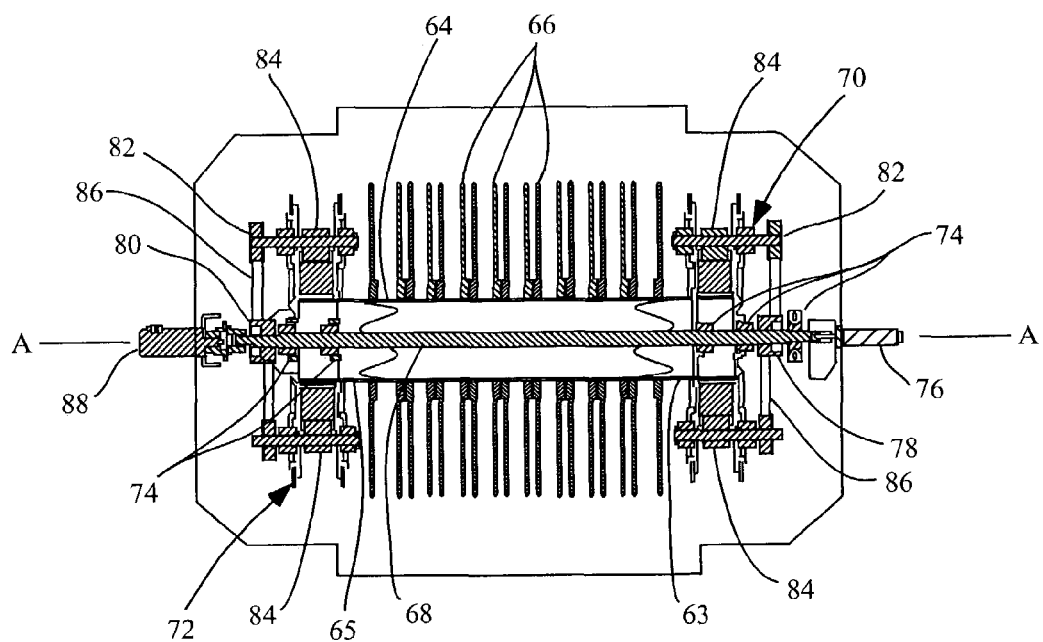
Fig. 12

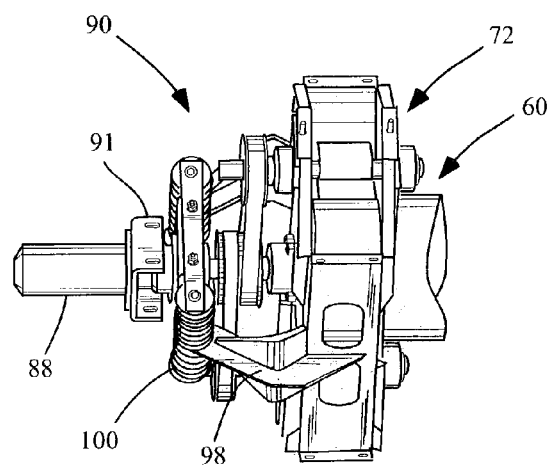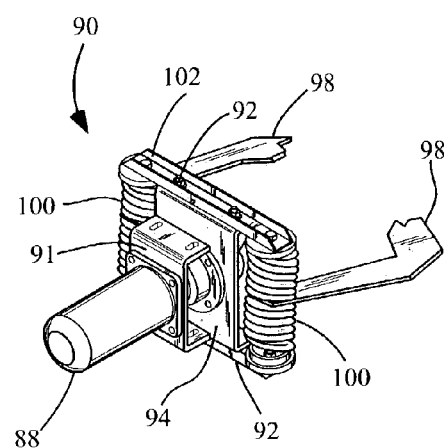
Fig. 13              Fig. 14
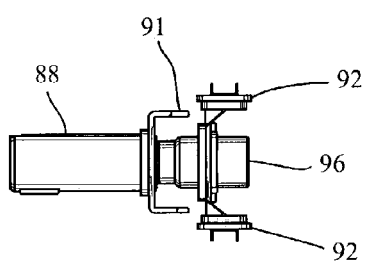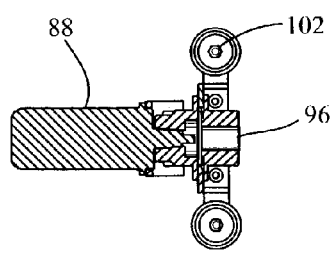
Fig. 15              Fig. 16

TOMATO HARVESTER

CROSS-REFERENCE TO RELATED APPLICATION

U.S. Provisional Application No. 60/405,180 was filed for this invention on Aug. 21, 2002 for which the inventor claims domestic priority.

BACKGROUND OF THE INVENTION

The present invention generally relates to devices which harvest fruits and vegetables from vinous plants, and more particularly to a tomato harvester having the capacity to harvest multiple rows of tomatoes in a single pass.

The ultimate objective of any harvester is to maximize the quantity of usable fruit harvested while minimizing the time and expense of bringing in the harvest. In pursuit of this objective, many different plant harvesters have been developed over the years and are known in the art. Harvesters of fruits and vegetables from vinous plants generally employ a upwardly angled ground-engaging conveyor having a plant severing or uprooting device at the lower end of the conveyor. As these harvesters travel through a field, they generally travel along a single row where they sever or uproot each entire plant in the row. The severed plants, fruit included, are conveyed upward from the ground level by assorted lifting means with which the harvester may be equipped. The severed plants and fruit are then processed through some type of separating means, such as a shaker, for separating the crop from the vine or other plant mass. One type of shaker, the drum variety, uses a drum with tines extending radially outward from the drum. Adjacent to the tines are stationary fingers or rods. The drum and tines rotate, undergoing angular acceleration and deceleration, so that the drum oscillates. The fruit-laden vines are engaged between the fingers and the tines, with the accelerating and decelerating tines stripping the fruit from the vines. The dislodged fruit generally falls through openings below the shaker, landing on another conveyor and is further processed through the harvester. Fruit which has been accepted for collection is thereafter conveyed, usually overhead, through a chute or other means into a collection vehicle traveling alongside the harvester. The remaining plant mass is moved out of the shaker, routed through the back of the harvester and dropped back onto the ground for collection or tilling.

The drum shaker has proven to be a highly effective device for separating tomatoes from the vines. Examples of harvesters using drum shakers are disclosed in U.S. Pat. Nos. 4,323,506; 4,335,570; 4,915,671; 4,927,440; 5,099,636; 5,316,519; 5,480,353; and 5,573,459.

It is desirable to harvest the fruit quickly to reduce the amount of time and manpower necessary to bring the harvested crop to the market. One means of reducing the time required for harvesting the crop is to harvest more than one row at a time. Although most machines harvest crops from a single row at a time, some dual-row machines are known for some agricultural products. For example, U.S. Pat. No. Re 34,678 (Fischer) discloses a harvester used for harvesting leafy vegetables, where the harvester has two harvesting sections arranged in side-by-side relation. The harvester disclosed in the '678 patent cuts leafy vegetables at ground level and transports the produce from the ground level to an upper position where the produce drops into receiving containers. The harvester disclosed in the '678 patent does not disclose any means for separating fruit from vegetable mass.

U.S. Pat. No. 4,965,993 (Butler) discloses a harvester specifically designed for harvesting cucumbers. This device employs two cutter assemblies, which are mounted on each side of a vehicle. The harvester disclosed in the '993 patent does not disclose the use of an oscillating drum shaker for separating the fruit from the vines, but instead employs a sharp circular edge or side edge to shear the fruit from the vine. U.S. Pat. No. 4,261,163 (Shaw) discloses a tomato harvester specifically designed to harvest tomatoes grown on plastic mulch covered beds. However, while the '163 patent discloses twin conveyors for transporting cut plants, the harvester does not separate the fruit from the vines. Instead, the cut plants, still bearing fruit, are dumped to the rear of the harvester. The cut plants are left in the field to wilt, and further processing is required to remove the fruit from the vines.

U.S. Pat. No. 4,047,573 (Cortopassi) discloses an apparatus for simultaneously harvesting two or more crop rows. A principal feature of the device disclosed in the '573 patent is the provision of dual header conveyors. Each header conveyor has a separator conveyor at its trailing end to receive vines discharged from the trailing ends of the header conveyors. From the separator conveyor, vines and attached tomatoes are transferred onto shaker conveyors. Thus, the harvester disclosed in the '573 patent does not employ a drum shaker, but instead relies on separate shaker conveyors to disengage the fruit from the vines.

Therefore, there are no known harvesters which harvest tomatoes and similar crops from multiple rows and employ drum shaker separation to separate the fruit from the vines. Several reasons may explain why such a machine, until now, has not been disclosed. First, because harvesters are frequently transported on public roads, the harvester may not exceed certain width limitations, generally a maximum of 120 inches. However, tomato rows are typically separated, from center to center, by a distance of approximately 60 to 66 inches. Therefore, a harvester capable of harvesting three rows would be expected to have ground-engaging conveyors with a combined minimum width exceeding 120 inches, which generally exceeds the width restrictions for most public roads. Second, increasing the number of rows being harvested proportionally increases the combined mass of fruit and vines which must be processed through the shaker to separate the fruit from the vines. However, increasing the capacity of the shaker by increasing the drum width in proportion to the increase in the combined mass of fruit and vines collected at the ground-engaging conveyors is impractical because of the overall width limitations previously discussed. In addition, the difficulty and cost of designing and manufacturing an extremely wide drum would be substantial because of the beam loading to which such a drum would be subjected. Therefore, a multiple row tomato harvester must not only be capable of gathering a mass of fruit and vines which may be three times or more larger than known machines, but it must also be capable of processing the increased mass with a drum shaker which is not increased in size in direct proportion to the increase in mass.

One might consider increasing the capacity of a drum shaker by simply increasing the speed, i.e., the angular velocity of the her by increasing the magnitude of the acceleration and deceleration of the drum, i.e. increasing the amplitude or frequency of the shaking mechanism. However, the fruit can be delicate, and more violent shaking is likely to damage the fruit resulting in a decrease in usable harvested fruit. In addition the capacity of the known shakers is limited by the durability and strength constraints of the shaker components.

An early version of the oscillating drum shaker is disclosed in U.S. Pat. No. 4,323,506 (Studer). In the device disclosed in the '506 patent, the severed plants are rotated underneath an oscillating tine-covered drum. The plants are shaken by subjecting them to angular acceleration and deceleration while the vines are transported around an arcuate path. A series of parallel fixed rods or bars below the drum hold the vegetative mass closely against the tines in an "envelope" area, preventing the vegetative mass from falling down or away from the drum tines. The oscillation of the drum shakes the tines and the vegetative mass, dislodging much of the fruit which falls between the rods for conveyance elsewhere. The rotation of the drum takes the vegetative mass rearward around the bottom of the drum where it is disengaged from the drum tines and then deposited on a conveyor for discard.

The '506 patent generally employs two motors to achieve the superposition of oscillatory motion on a constant angular velocity rotation. A first motor drives a main shaft at a constant angular velocity, the main shaft causing the rotation of auxiliary shafts to which are mounted eccentric weights. A second motor is mounted around but not coupled to the main shaft, the second motor having a hollow shaft. The hollow shaft is connected to the drum frame with a torsion spring, which is connected on one end to the hollow shaft and connected on the other end to a frame securing the drum. The torsion spring allows rotation and oscillation of the drum without causing damage to either the first or second motor. However, because the spring is constantly subjected to torsion, failure is inevitable. Significantly, for the harvester disclosed in the '506 patent, both the first and second motor are mounted to the outside of the torsion spring, on the same side of the drum, thereby requiring removal of both motors to replace the spring.

U.S. Pat. No. 5,316,519 (Johnson) also employs two motors to superimpose an oscillatory motion on the angular velocity rotation, however the '519 patent utilizes a different coupling mechanism to couple the drum frame and the oscillation motor. The '519 patent employs a rubber "biscuit" as a coupling, which provides a limited degree of torsional resilience between the hydraulic motor and the oscillation shaft. The problem with using elastomeric compounds for the oscillation coupling is that the couplings quickly become hot as they are subjected to repeated oscillation cycles and often fail. Unlike the '506 patent which directly drives a high speed shaft with a hydraulic motor, the '519 patent couples the weight shafts to the hydraulic motor via belt drive.

Therefore, the mounting design of the motor, or motors, and the mechanism for connecting the motor to the drum must be improved to withstand the increased loads for a multiple row harvester.

The present invention is directed toward a tomato harvester which is able to collect fruit and vines from multiple rows simultaneously, where the harvester meets standard highway width limitations and the design of the drum shaker is able to effectively process the increased mass of fruit and vines, having a coupling mechanism which is capable of withstanding greater loads and a motor design which provides for easy installation and maintenance of the motors.

SUMMARY OF THE INVENTION

The present invention is directed to a new and more efficient tomato harvesting machine which is capable of simultaneously severing up to three (3) rows of tomato vines. In a tomato harvester, where the vines are severed near ground level and removed from the ground with severing means, the harvester may be generally described as comprising a wheel-mounted frame having a forward end, a rear end, a right side, a left side and a center. Means are provided for moving the frame forwardly in a tomato field. Pick up means are adjacent to the forward end for picking up and severing vinous crops from the ground, where the crops remain attached to the vines, as the vines are severed. The pick up means carry the crops and vines rearwardly and upwardly. Separating means are mounted on the frame for separating the crops from the vines. A crop conveying system is provided which transports the separated fruit through crop sorting means. A vine conveying system for transporting vines through vine processing means is also provided.

The present invention comprises a tomato harvester having a substantial increase in capacity which is achieved through an improved pickup means and processing train. The improvement comprises a plurality of lower endless loop spaced-apart parallel conveyors comprising a central conveyor and either a right-side outrigger conveyor, a left-side outrigger conveyor, or both. The central conveyor, right-side outrigger conveyor, and left-side outrigger conveyor extend from the forward end of the frame, each conveyor having a bottom end and a top end, a cutter attached at the bottom end. The right-side outrigger conveyor and/or left-side outrigger conveyor are pivotally attached to the central conveyor. The pivotal attachment allows the right-side outrigger conveyor and/or left-side outrigger conveyor to be pivoted from a first position with either outrigger conveyor in position to gather and convey crops, to a second position with either outrigger conveyor in a raised position at approximately a right angle to the plane of the central conveyor.

The improved pickup means may further comprise lower right and/or lower left cross-conveyors respectively mounted on the frame at the top end of the right-side outrigger conveyor, the left-side outrigger conveyor and the central conveyor. The cross-conveyors may be mounted transversely to the lower right outrigger conveyor, the lower left outrigger conveyor and the central conveyor, the lower cross-conveyors for receiving crops and attached vines transported upwardly from the right-side outrigger conveyor, the left-side outrigger conveyor and the central conveyor, and moving the crops and attached vines from a direction from the right and left sides of the frame toward the center of the frame.

The improved pickup means further comprises an intermediate endless loop conveyor mounted transverse to the lower cross-conveyors and/or at the top end of the lower parallel conveyors. The intermediate conveyor receives crops and attached vines from either the cross-conveyors or from the lower parallel conveyors and transports the crops and attached vines upwardly to separating means.

The improved pickup means requires an improved separating means for processing the additional quantity of fruit and vines picked up by the harvester, the improved separating means comprising a drum shaker. The drum shaker comprises a drum assembly disposed within a drum housing and a plurality of stationary rods supported by the drum housing or the frame. The drum shaker comprises a drum having a first end and a second end which define a longitudinal axis oriented transversely to the travel direction of the harvester. A plurality of tines extend radially from the outer peripheral surface of the drum. A first shaft extends through the drum and through a first weight housing which is adjacent and coupled to the first end of the drum. A first hydraulic motor is coupled to the first shaft. A plurality of weight shafts are secured within the first weight housing, where a plurality of eccentrically mounted weights are mounted on the weight shafts. Transmission means connect the first shaft to the weight shafts, allowing the eccentrically mounted weights to be rotated.

A second weight housing is attached to the second end of the drum. A second hydraulic motor is coupled to the second weight housing with a spring coupling. The spring coupling comprises a pair of plates disposed in spaced apart facing relation on either side of a center plate.

These and other features, aspects, and advantages of the present invention will become better understood with regard to the following description, appended claims, and accompanying drawings.

BRIEF DESCRIPTION OF THE DRAWINGS

FIG. 10 shows a perspective view of the drum, showing only a representative sample of tines.

FIG. 11 shows a side view of the drum.

FIG. 12 shows a view taken along line 12—12 of FIG. 11.

FIG. 13 shows a detailed view of the spring coupling attached to the second weight housing.

FIG. 14 shows a perspective view of the spring coupling.

FIG. 15 shows a side view of the second hydraulic motor and the spring coupling without the springs.

FIG. 16 shows a top view of the second hydraulic motor and the spring coupling.

DETAILED DESCRIPTION OF THE EMBODIMENTS

As used in this Description, the terms "left" and "right" are with respect to an operator's point of view, looking forward from the operator compartment of the harvester.

Figure 1:
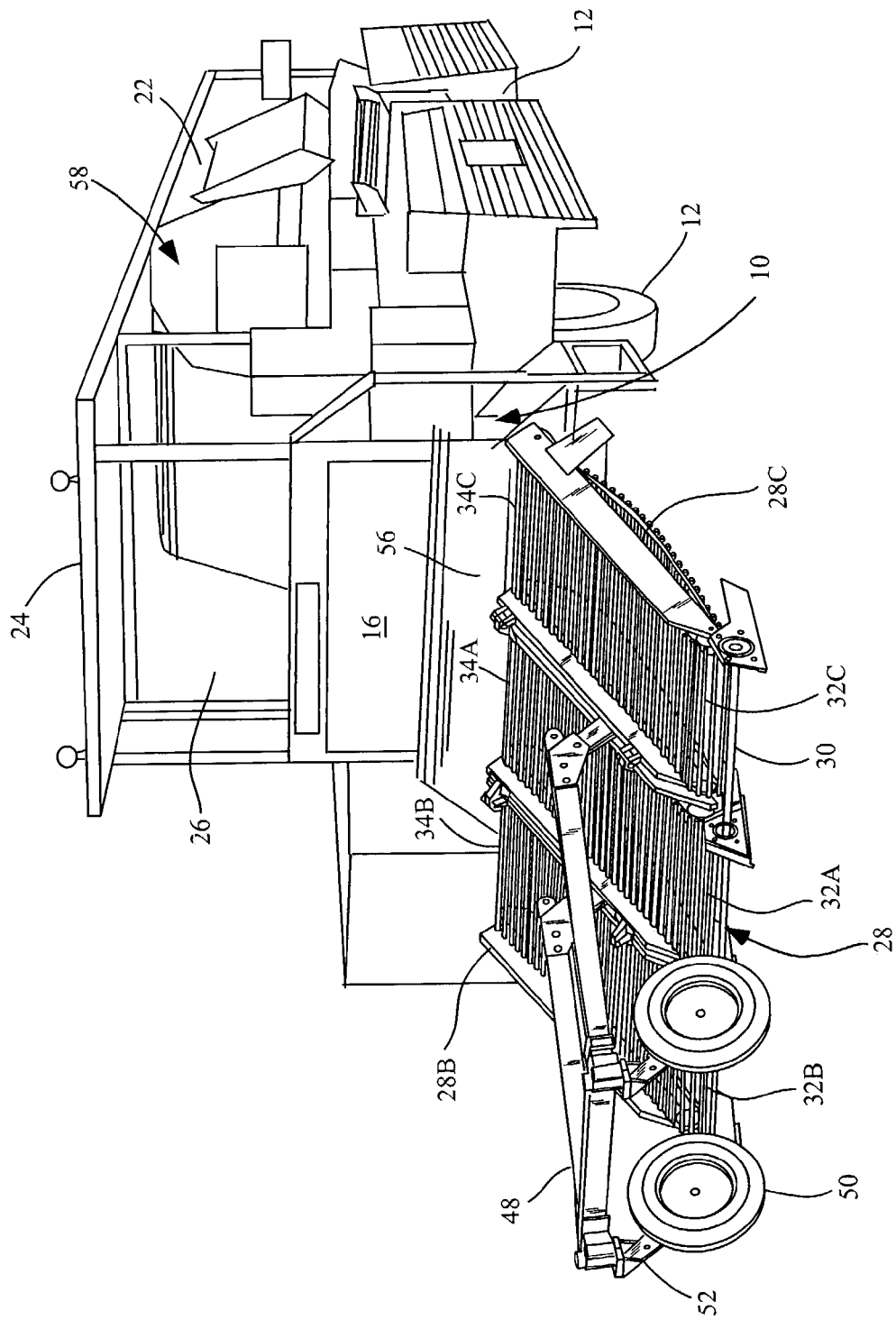
FIG. 1 is a perspective view of the disclosed improved harvester showing the three ground engaging conveyors.
Figure 2:
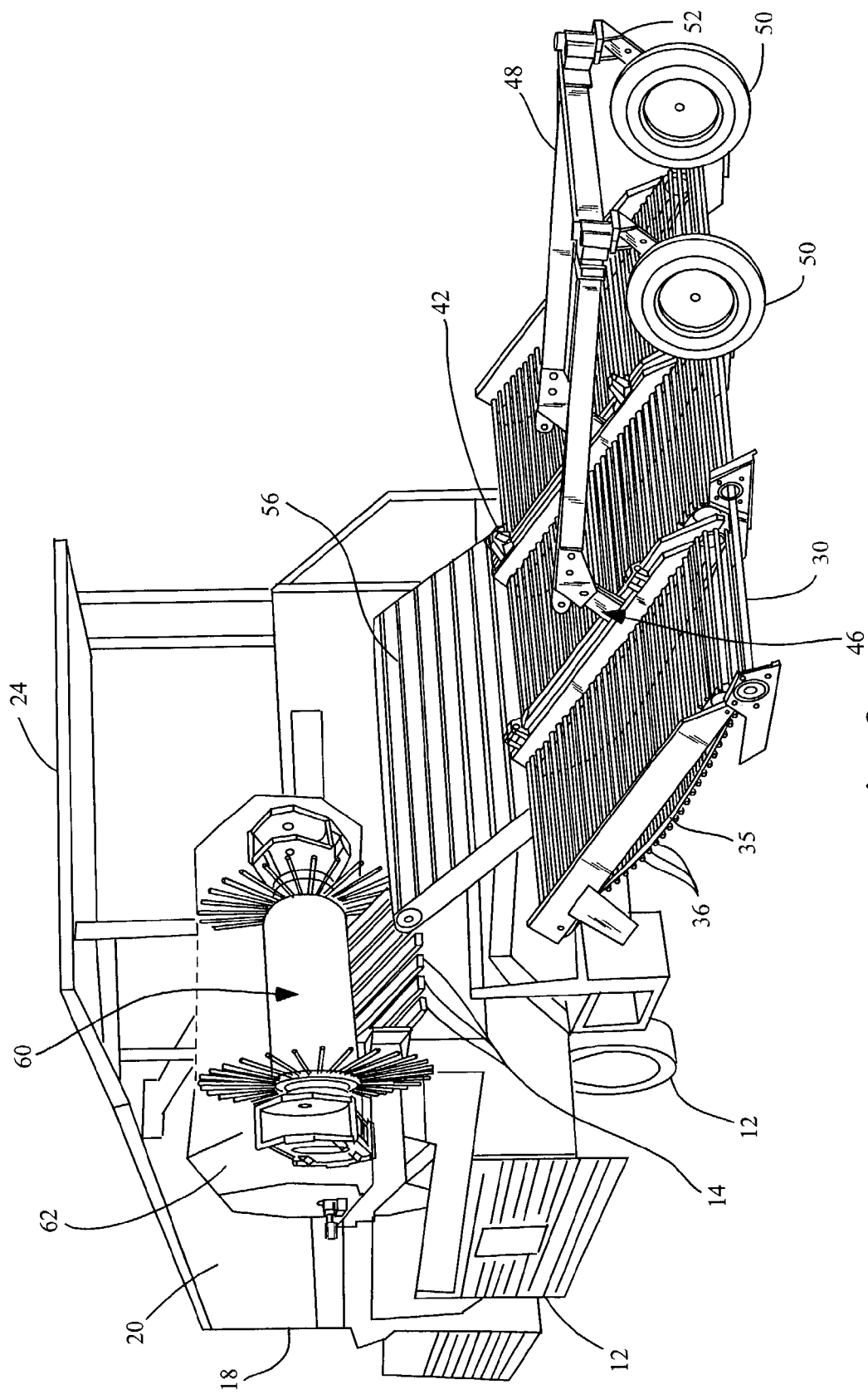
FIG. 2 is second perspective view of the disclosed improved harvester, showing the general location of the drum shaker.

Referring now to the drawings, FIGS. 1 and 2 generally depict the multiple-row features of the improved harvester. The present invention includes a frame 10, ground engaging wheels 12, and an engine (not shown) for propulsion and other power requirements. The frame 10 has a forward end 16, a rear end 18, a right side 20, a left side 22, a center 24, and an operator compartment 26. The device has pick-up means, such as ground-engaging conveyors 28, for transporting crops, vines and other material rearwardly and upwardly on the harvester. The ground-engaging conveyors 28 have severing means, such as cutters 30, at the leading edge of each conveyor. Forward motion of the harvester thrusts cutters 30 below the ground surface where the cutters engage and sever the roots of the crop laden vines or plants. The crop laden plants, and some dirt and other debris are then carried rearwardly and upwardly on the ground-engaging conveyors 28 for further processing through separating means which separate crops from the vines. The tomatoes or other crops are sorted and then conveyed over to a support vehicle by means of an overhead conveyor (not shown).

Figure 3:
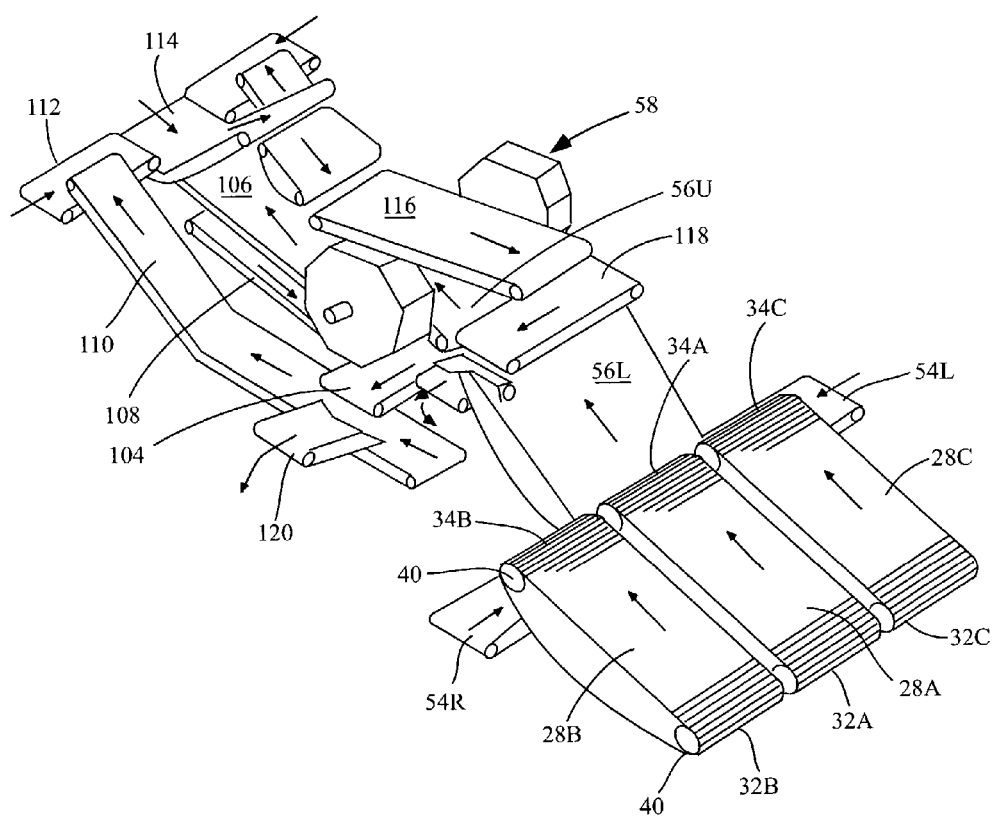
FIG. 3 is a schematic diagram of the present invention showing the flow of plant material through the harvester.
Figure 4:
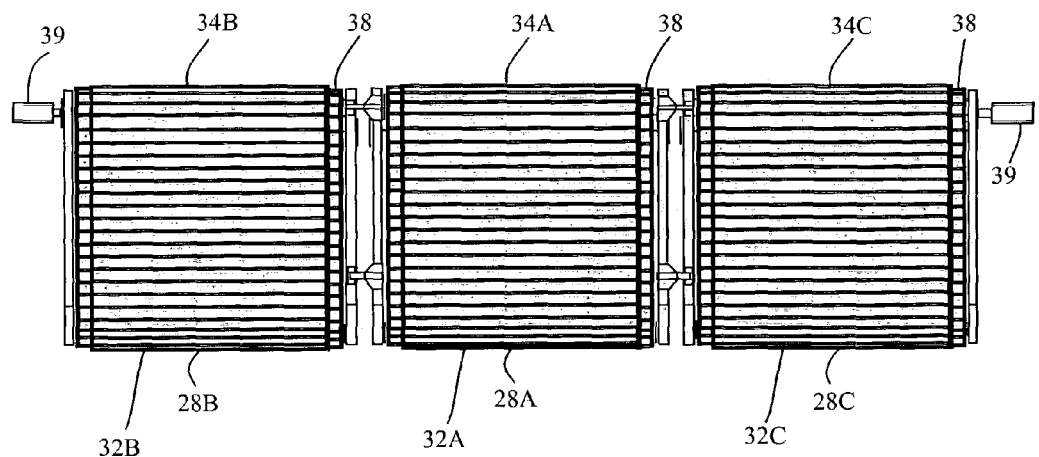
FIG. 4 shows a top view of the ground engaging conveyors in the first position, also referred to as the "downward" position.
Figure 5:
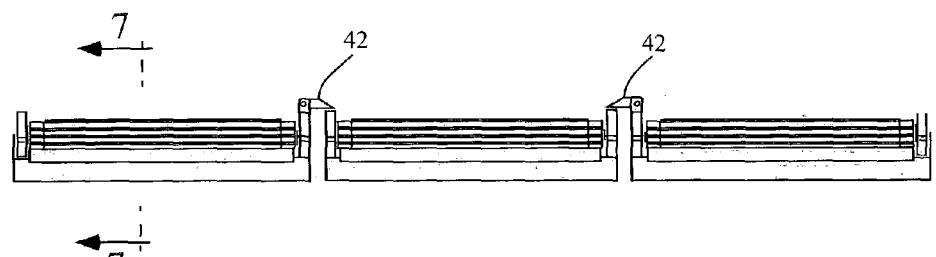
FIG. 5 shows a front view of the ground engaging conveyors.
Figure 6:
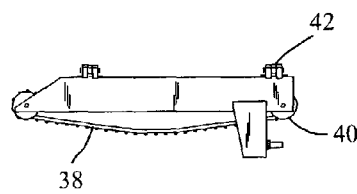
FIG. 6 shows a side view of the ground engaging conveyors.
Figure 7:
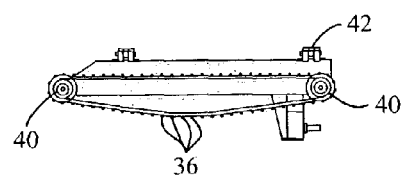
FIG. 7 shows a view taken along line 7—7 of FIG. 5.

FIG. 3 schematically depicts the flow of vines and tomatoes through the device, from the time the crop-laden plant is severed from the ground until tomatoes are discharged to the overhead conveyor and the waste products are transported to the rear of the device for either direct discard or for processing through a chopper or mulcher. The disclosed harvester has a plurality of ground-engaging conveyors 28, comprising a central conveyor 28A, a right-side outrigger conveyor 28B, and a left-side outrigger conveyor 28C. The central conveyor 28A, right-side outrigger conveyor 28B, and left-side outrigger conveyor 28C extend from the forward end 16 of the harvester, each conveyor having a bottom end 32 and a top end 34. Each conveyor may be comprised of a plurality of rods 36 with belts or couplers 38 attached to the ends of the rods. As appreciated by those skillful in the art, conveyors 28, as well as the other conveyors referred to in this specification, may be comprised of belts, chains, belted chains or other similar continuous loop structures.

The conveyors may be driven by a separate hydraulic motor 39 attached to a drive shaft 40 which may be located at the top end 34 of each conveyor 28. The drive shaft 40 engages the belts or couplers 38 to move each conveyor in the direction indicated on FIG. 3. As an alternative to a separate hydraulic motor on each conveyor 28, the drive shaft 40 of the left-side conveyor 28C and the right-side conveyor 28B may be connected to the drive shaft 40 of central conveyor 28A with couplings, such as U-joints or knuckle joints, such that the drive shafts of the left-side conveyor 28C and the right side conveyor 28B are rotated by the drive shaft 40 of the central conveyor 28A when either the left-side conveyor 28C or the right-side conveyor 28B are in the lowered position. In such case, a hydraulic motor 40 would be connected to the drive shaft 40 of central conveyor 28A.

Figure 8:
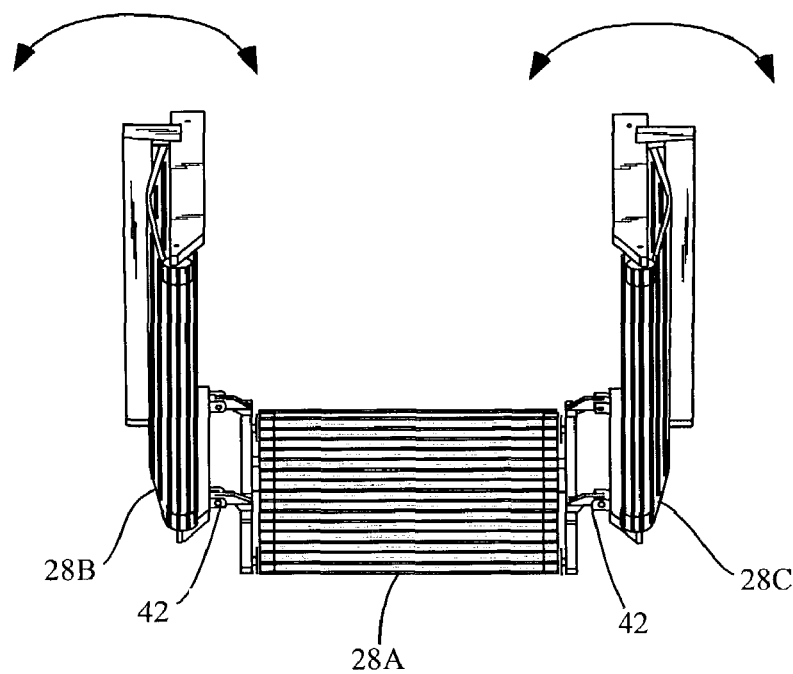
FIG. 8 shows a front view of the ground engaging conveyors with the outrigger conveyors in the second position, also referred to as the "upward" position.
Figure 9:
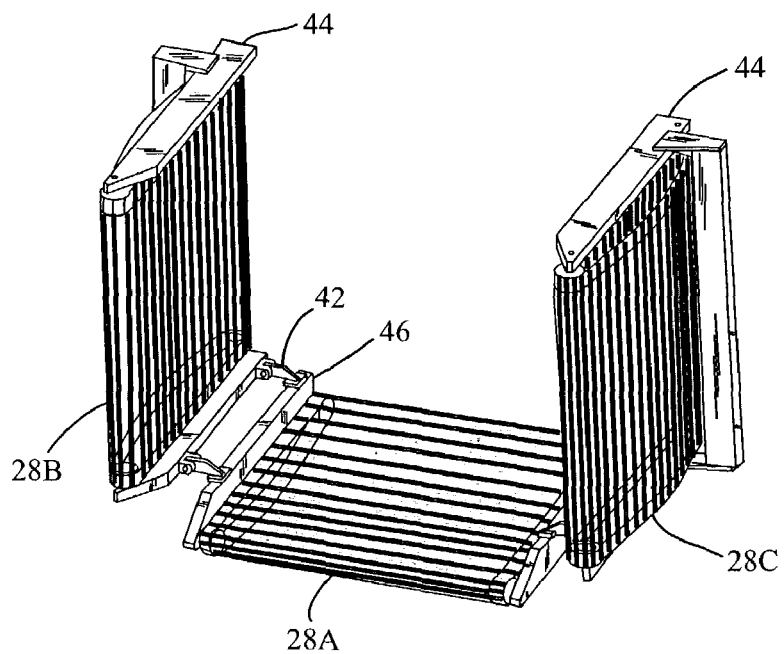
FIG. 9 shows a perspective view of the ground engaging conveyors with the outrigger conveyors in the second position.

As shown in FIGS. 8–9, the right-side outrigger conveyor 28B and/or left-side outrigger conveyor 28C are pivotally attached to the central conveyor 28A by connectors 42, which may be simple pin hinges. Central conveyor 28A is connected to the forward end 16 of the harvester. The right-side outrigger conveyor 28B and left-side outrigger conveyor 28C are each supported within a separate support structure 44, which are connected to the support structure 46 of central conveyor 28A. The pivotal attachment with connectors 42 allows the right-side outrigger conveyor 28B and/or left-side outrigger conveyor 28C to be pivoted from a first position with either conveyor in the same relative position as the central conveyor 28A to sever and gather crops (i.e., the "downward position") as depicted in FIG. 1, to a second position with either outrigger conveyor being at approximately a right angle to central conveyor 28A as shown in FIGS. 8–9 (the "upward position"). Hydraulic rams may be used to independently raise the right-side outrigger conveyor 28B and the left-side outrigger conveyor 28C back and forth between the first position and the second position.

Wheel support frame 48 is pivotally attached to the support structure 46 of central conveyor 28A. Support wheels 50 are attached to wheel support frame 48 by wheel struts 52. Support wheels 50 are spaced from 60 to 66 inches apart and sized such that each wheel rides in the furrow adjacent to a row of tomato plants.

It is to be appreciated that the top end 34B of right-side outrigger conveyor 28B and the top end 34C of left-side outrigger conveyor 28C may be at a different elevation than the top end 34A of central conveyor 28A so as to allow sufficient clearance for attaching a hydraulic motor 39 to the drive shaft 40 of the central conveyor. In this situation, the right-side outrigger conveyor 28B and the left-side outrigger conveyor 28C would not be in the same plane as the central conveyor 28A.

If the drive linkage for the right-side outrigger conveyor 28B and left-side outrigger conveyor 28C comprises a knuckle-joint configuration as discussed above, the connectors may be adapted such that the shaft for the respective outrigger conveyor is engaged when the outrigger conveyor is in the first position, but disengages when the outrigger conveyor is in the second position. Therefore, right-side outrigger conveyor 28B and left-side outrigger conveyor 28C may be operationally-coupled with central conveyor 28A such that the outrigger conveyors are rotating only when the conveyors are in the first position. Independent control of each conveyor 28 may be obtained by attaching a separate hydraulic motor to each conveyor.

The directional arrows in FIG. 3 show the flow of material through the harvester. Cutters 30 (not shown in FIG. 3) are provided at the bottom end 32 of each ground-engaging conveyors 28A, 28B and 28C, which sever the plants from the ground for further processing on the harvester. The cutters are of a type known in the art, being either the sickle or rod weeder variety. Different combinations of cutters and ground-engaging conveyors may be used, depending upon the number of rows desired to be simultaneously harvested (three are shown in FIG. 3). For example, all three conveyors 28 may be in the first position, thereby allowing three rows to be simultaneously harvested. Alternatively, the left-side outrigger conveyor 28C may be in the second position while right-side conveyor 28B is in the first position, allowing two rows to be simultaneously harvested. Alternatively, the left-side outrigger conveyor 28C may be in the first position while right-side conveyor 28B is in the second position, once again allowing two rows to be simultaneously harvested.

As shown schematically in FIG. 3, a lower right cross-conveyor 54R may be transversely mounted at the top end 34B of the right-side outrigger conveyor 28B. The lower right cross-conveyor 54R receives crops and attached vines transported upwardly from the right-side outrigger conveyor 28B and moves the crops and attached vines in a direction from the right side 20 of the harvester toward the center 24 of the harvester. Likewise, a lower left cross-conveyor 54L is transversely mounted at the top end 34 of the left-side outrigger conveyor 28C. The lower left cross-conveyor 54L receives crops and attached vines transported upwardly from the left-side outrigger conveyor 28C and moves the crops and attached vines in a direction from the left side 22 of the harvester toward the center 24 of the harvester. Lower right cross-conveyors 54R and lower left cross-conveyor 54L collect the severed crop laden plants from right-side outrigger conveyor 28B and left-side outrigger conveyor 28C and deposit them onto intermediate conveyor 56. Central conveyor 28A deposits severed plant mass directly onto intermediate conveyor 56. As shown in FIG. 3, intermediate conveyor 56 may comprise lower intermediate conveyor 56L and upper intermediate conveyor 56U, where there is a slight gap between the two.

Intermediate conveyor 56 may be mounted such that the long axis of the intermediate conveyor 56 approximately coincides with the center 24 of the harvester. The intermediate conveyor 56 receives crops and attached vines at its lower end from the lower right cross-conveyor 54R and conveys the crops and attached vines to separating means, such as drum shaker 58. Likewise, intermediate conveyor 56 receives crops and attached vines at its lower end from the lower left cross-conveyor 54L and conveys those crops and vines to the drum shaker 58.

An overhead conveyor belt, not shown, may be provided above intermediate conveyor 56 in order to keep the plant mass from falling from the open sides of the conveyor. Dirt and debris transported with the plant mass drop out at the opening between the lower intermediate conveyor 56L and upper intermediate conveyor 56U. The remaining plant mass with attached fruit enters the drum shaker 58.

The drum shaker 58 comprises a drum assembly 60 disposed within a drum housing 62. A perspective view of drum assembly 60 is shown in FIG. 10. Drum assembly 60 generally comprises a drum 64, a first shaft 68 extending through the drum, a first weight housing 70, a second weight housing 72, means for rotating the drum 64, and means for rotating the first shaft, which rotates weights contained within the first weight housing and the second weight housing.

More specifically, drum 64 has a first end 63 and a second end 65, which define a longitudinal axis A oriented transverse to the travel direction of the harvester. The drum 64 has a plurality of tines 66 extending radially from the outer peripheral surface of the drum. FIG. 2 and FIG. 10 do not depict all of the tines 66 which are attached to the drum 64, but only show a representative sample. In actuality, tines extend radially completely across the length of drum 64. First shaft 68 extends through the length of the drum 64. The drum assembly 60 further comprises a first weight housing 70 coupled to the first end 63 of the drum 64 and a second weight housing 72 coupled to the second end 65. The first shaft 68 extends through the first weight housing 70 and the second weight housing 72, with the shaft supported by bearings 74. First shaft 68 is rotated by power means such as first hydraulic motor 76. First hydraulic motor 76 may be mounted to drum housing 62 or to a bracket extending from frame 10.

First sheave 78 and second sheave 80 are attached to first shaft 68. A plurality of weight shafts 82 are disposed within the first weight housing 70, and a plurality of eccentrically mounted weights 84 are mounted on the weight shafts 82. Transmission means, such as belts 86, connect the first sheave 78 to the weight shafts 82 for rotating the eccentrically mounted weights 84 within the first weight housing 70. Likewise, a plurality of weight shafts 82 are disposed within the second weight housing 72 and a plurality of eccentrically mounted weights 84 are mounted on the weight shafts. Transmission means, such as belts 86, connect the second sheave 80 to the weight shafts 82 for rotating the eccentrically mounted weights 84 within the second weight housing 72.

The drum assembly 60 further comprises power means for rotating the drum 64, the first weight housing 70 and the second weight housing 72. Such power means may comprise second hydraulic motor 88 coupled to the second weight housing 72 as shown in FIGS. 10 and 12, where the second hydraulic motor 88 is coupled to flanges 98 on the second weight housing 72 with a spring coupling 90. Second hydraulic motor 88 may be attached to the frame 10 of the harvester with mounting plate 91.

As shown in greater detail in FIGS. 13 and 14, the spring coupling 90 comprises a pair of end plates 92 disposed in spaced apart facing relation on either side of center plate 94. Set within center plate 94 is end bearing 96, in which the end of first shaft 68 rotates. The shaft of second hydraulic motor 88 is connected to center plate 94. Flanges 98 extend outwardly from second weight housing 72 for attachment to spring coupling 90. The ends of flanges 98 are sandwiched between springs 100, which are disposed between end plates 92 and held in place by retention means such as retaining bolts 102.

Crops, such as tomatoes and the associated vines, are conveyed into drum shaker 58 by intermediate conveyor 56. As drum 64 rotates within drum housing 62, the plant mass and fruit become entangled in the tines 66. The tines rotate amidst a plurality of stationary fingers 14 which are mounted inside the drum housing 62. At the same time the drum 64 is rotated by the second hydraulic motor 88, the first hydraulic motor 76 is rotating first shaft 68, thereby rotating first sheave 78 and second sheave 80, causing the eccentrically mounted weights 84 to spin within the first weight housing 70 and second weight housing 72. The spinning weights superimpose an oscillation or pulse on the rotating drum 64, causing a snapping motion of the tines 66 relative to the stationary fingers 14. This motion dislodges the fruit from the plant mass, allowing the fruit to fall through the fingers 14 to a fruit conveyor 104 located below the drum shaker 58, as shown in the schematic of FIG. 3. It has been found that a maximum angular velocity of approximately 200 revolutions per minute, combined with a larger weight mass, effectively separates the fruit from the vines. A multiple row harvester will require greater weight than the known single row machines, because greater torque is required by the drum shaker to effectively separate the fruit from the vines. The weight mass required to effectively process tomatoes simultaneously harvested from three rows is expected to be in the range of 800 to 1500 pounds, and the weight must exceed 450 pounds. The spring coupling 90 provides a shock absorber between the second hydraulic motor 88 and the drum 64, because the rotating weights impose a secondary motion on the rotating drum, which would otherwise damage the second hydraulic motor 88 and/or the drum 64.

The remaining plant mass falls from the tines 66 and drops onto chain conveyor 106 for conveyance to the rear of the harvester. Chain conveyor 106 has openings large enough for any remaining fruit to fall through and onto return conveyor 108 for return to fruit conveyor 104. Discarded plant mass exits chain conveyor 106 at the rear of the harvester and may be either dropped onto the ground below the harvester, or further processed through vine processing means, such as a chopper located at the rear end 18 of the harvester. A John Deere straw chopper is a suitable device for processing the discarded plant mass. This feature of the invention allows the discarded vine mass to be tilled into the soil rather than having to be gathered and burned or otherwise disposed.

Fruit which reaches fruit conveyor 104 is transported via side conveyor 110 upward to the rear of the harvester. A blower fan blows loose leaves and dirt from the fruit as it travels along side conveyor 110. Rear cross conveyor 112 takes fruit from side conveyor 110 to conveyor 114 which then drops the fruit onto conveyor 116. A gap separates conveyor 114 and conveyor 116, which allows further dirt and debris to drop onto chain conveyor 106. A suction is applied as the fruit drops onto conveyor 116 to remove any remaining debris or dirt. The fruit is then available for hand sorting as it travels along conveyor 116 or for processing through an automatic sorting device. This allows the removal of unwanted dirt, unripe or moldy fruit, etc. Good fruit drops from conveyor 116 to cross conveyor 118 and onto exit conveyor 120 for overhead conveyance into a vehicle traveling alongside the harvester.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. In a harvester for vine crops, such as tomatoes, wherein the vines are severed near ground level and removed from the ground with severing means, where the harvester has a wheel-mounted frame having a forward end, a rear end, a right side, a left side and a center, means for moving said harvester forwardly in a field, pickup means adjacent said forward end for picking up crops and attached vines from the field and carrying the crops and vines rearwardly and upwardly, and separating means for separating crops from the vines, an improved separating means comprising:
   (a) a drum housing;
   (b) a drum assembly disposed within the drum housing, the drum assembly comprising: (i) a drum having a first end and a second end, the first and second end defining a longitudinal axis oriented transverse to the travel direction of the harvester, and a multiplicity of tines extending radially from the outer peripheral surface of the drum; (ii) a first shaft extending through the drum; (iii) a first weight housing adjacent and coupled to the first end, the first shaft extending through the first weight housing; (iv) a second weight housing adjacent and coupled to the second end; (v) a first hydraulic motor coupled to the first shaft; and (vi) a second hydraulic motor for rotating the drum connected to the second weight housing with a spring coupling, the spring coupling comprising a plurality of springs disposed between two end plates, the end plates on either side of a center plate which supports the first shaft; and
   (c) a plurality of stationary rods mounted adjacent to the tines of the drum such that the tines pass through the stationary rods as the drum rotates.

2. The improved separating means of claim 1, wherein the first weight housing and the second weight housing each comprise: (i) a plurality of weight shafts secured within each weight housing; (ii) a plurality of eccentrically mounted weights mounted on the weight shafts; (iii) transmission means connecting the first shaft to the weight shafts in the weight housings for rotating the eccentrically mounted weights mounted therein.

3. The improved separating means of claim 2 wherein the transmission means comprise a first sheave mounted on the first shaft coupled to the weight shafts of the first weight housing with belts and a second sheave mounted on the first shaft coupled to the weight shafts of the second weight housing with belts.

4. The improved separating means of claim 1, wherein the angular velocity of the drum does not exceed 200 revolutions per minute.

5. In a harvester for vine crops, such as tomatoes, wherein the vines are severed near ground level and removed from the ground with severing means, where the harvester has a wheel-mounted frame having a forward end, a rear end, a right side, a left side and a center, means for moving said harvester forwardly in a field, and pickup means adjacent said forward end for picking up crops and attached vines from the field and carrying the crops and vines rearwardly and upwardly, and separating means for separating crops from the vines, improvements to the harvester comprising:
   (a) the pickup means comprising: a plurality of ground-engaging conveyors comprising a central conveyor and an outrigger conveyor, the central conveyor and outrigger conveyor extending from the forward end of the harvester, each conveyor having a bottom end and a top end, a cutter attached at the bottom end;
   (b) the separating means comprising:
      (i) a drum housing;
      (ii) a drum assembly disposed within the drum housing, the drum assembly comprising: (1) a drum having a first end and a second end, the first and second end defining a longitudinal axis oriented transverse to the travel direction of the harvester, and a multiplicity of tines extending radially from the outer peripheral surface of the drum; (2) a first shaft extending through the drum; (3) a first weight housing adjacent and coupled to the first end, the first shaft extending through the first weight housing; (4) a second weight housing adjacent and coupled to the second end; (5) a first hydraulic motor coupled to the first shaft; and (6) a second hydraulic motor for rotating the drum connected to the second weight housing with a spring coupling, the spring coupling comprising a plurality of springs disposed between two end plates the end plates on either side of a center plate which supports the first shaft; and
      (iii) a plurality of stationary rods mounted adjacent to the tines of the drum such that the tines pass through the stationary rods as the drum rotates.

6. The harvester of claim 5 wherein the wherein the first weight housing and the second weight housing each comprise: (i) a plurality of weight shafts secured within each weight housing; (ii) a plurality of eccentrically mounted weights mounted on the weight shafts; (iii) transmission means connecting the first shaft to the weight shafts in the weight housings for rotating the eccentrically mounted weights mounted therein.

7. The harvester of claim 6 wherein the transmission means comprise a first sheave mounted on the first shaft coupled to the weight shafts of the first weight housing with belts and a second sheave mounted on the first shaft coupled to the weight shafts of the second weight housing with belts.

8. The harvester of claim 6, wherein the total weight of the eccentrically mounted weights is in excess of 450 pounds.

9. The harvester of claim 6, wherein the angular velocity of the drum does not exceed 200 revolutions per minute.

10. In a harvester for vine crops, such as tomatoes, wherein the vines are severed near ground level and removed from the ground with severing means, where the harvester has a wheel-mounted mounted frame having a forward end, a rear end, a right side, a left side and a center, means for moving said harvester forwardly in a field, and pickup means adjacent said forward end for picking up crops and attached vines from the field and carrying the crops and vines rearwardly and upwardly, and separating means for separating crops from the vines, improvements to the harvester comprising:
   (a) the pickup means comprising: a plurality of ground-engaging conveyors comprising a central conveyor and an outrigger conveyor, the central conveyor and outrigger conveyor extending from the forward end of the harvester, each conveyor having a bottom end and a top end, a cutter attached at the bottom end, the outrigger conveyor pivotally attached to the central conveyor such that the outrigger conveyor may be pivoted from a first position with the outrigger conveyor in the same relative position as the central conveyor, to a second position with the outrigger conveyor at approximately a right angle to the central conveyor;
   (b) the separating means comprising:
      (i) a drum housing;
      (ii) a drum assembly disposed within the drum housing, the drum assembly comprising: (1) a drum having a first end and a second end, the first and second end defining a longitudinal axis oriented transverse to the travel direction of the harvester, and a multiplicity of tines extending radially from the outer peripheral surface of the drum; (2) a first shaft extending through the drum; (3) a first weight housing adjacent and coupled to the first end, the first shaft extending through the first weight housing; (4) a second weight housing adjacent and coupled to the second end; (5) a first hydraulic motor coupled to the first shaft; and (6) a second hydraulic motor for rotating the drum connected to the second weight housing with a spring coupling, the spring coupling comprising a plurality of springs disposed between two end plates the end plates on either side of a center plate which supports the first shaft; and
      (iii) a plurality of stationary rods mounted adjacent to the tines of the drum such that the tines pass through the stationary rods as the drum rotates.

11. The harvester of claim 10 wherein the wherein the first weight housing and the second weight housing each comprise: (i) a plurality of weight shafts secured within each weight housing; (ii) a plurality of eccentrically mounted weights mounted on the weight shafts; (iii) transmission means connecting the first shaft to the weight shafts in the weight housings for rotating the eccentrically mounted weights mounted therein.

12. The harvester of claim 11 wherein the transmission means comprise a first sheave mounted on the first shaft coupled to the weight shafts of the first weight housing with belts and a second sheave mounted on the first shaft coupled to the weight shafts of the second weight housing with belts.

13. The harvester of claim 11, wherein the total weight of the eccentrically mounted weights is in excess of 450 pounds.

14. The harvester of claim 11, wherein the angular velocity of the drum does not exceed 200 revolutions per minute.

* * * * *